(12) United States Patent
Gregoire

(10) Patent No.: US 11,512,780 B2
(45) Date of Patent: Nov. 29, 2022

(54) PISTON O-RING SEAL WITH REDUCED STICTION

(71) Applicant: Roger J. Gregoire, New Braunfels, TX (US)

(72) Inventor: Roger J. Gregoire, New Braunfels, TX (US)

(*) Notice: Subject to any disclaimer, the term of this patent is extended or adjusted under 35 U.S.C. 154(b) by 0 days.

(21) Appl. No.: 16/723,647

(22) Filed: Dec. 20, 2019

(65) Prior Publication Data

US 2022/0260158 A1 Aug. 18, 2022

Related U.S. Application Data

(60) Provisional application No. 62/815,688, filed on Mar. 8, 2019.

(51) Int. Cl.
*F16J 15/32* (2016.01)
*F16J 15/3284* (2016.01)
*F02F 1/10* (2006.01)

(52) U.S. Cl.
CPC ............ *F16J 15/3284* (2013.01); *F02F 1/10* (2013.01)

(58) Field of Classification Search
CPC ................. F15B 1/24; Y10T 137/7826; Y10T 137/7793; F16J 9/22; F16J 15/32
USPC ........................................................ 277/549
See application file for complete search history.

(56) References Cited

U.S. PATENT DOCUMENTS

| | | | | |
|---|---|---|---|---|
| 2,748,801 A | * | 6/1956 | McCuistion | F15B 1/24 92/60 |
| 4,574,921 A | * | 3/1986 | Gergele | F16D 65/22 188/196 P |
| 2004/0216781 A1 | * | 11/2004 | Larsen | G05D 16/106 137/505.25 |

* cited by examiner

*Primary Examiner* — Long T Tran
*Assistant Examiner* — James J Kim
(74) *Attorney, Agent, or Firm* — Kammer Browning PLLC

(57) ABSTRACT

A piston and cylinder assembly structured to reduce breakaway friction (stiction) upon movement of the piston within the cylinder. The assembly includes a cylinder housing, a piston having a piston crown with a top face and one or more peripheral grooves, and an O-ring positioned on the piston in each of the one or more peripheral grooves. The piston crown incorporates one or more passageways extending from a space above the piston to a location within the peripheral groove inside of (behind) the O-ring. An increase in a volume of fluid in the chamber above the piston directs fluid through the passageways into the peripheral groove, thereby pressing the O-ring against the cylinder wall. A double acting piston embodiment uses at least two O-rings positioned within at least two grooves, each with associated fluid flow passageways into the grooves behind the O-rings.

20 Claims, 8 Drawing Sheets

PISTON O-RING SEAL WITH REDUCED STICTION

CROSS REFERENCES TO RELATED APPLICATIONS

This application claims the benefit under Title 35 United States Code § 119(e) of U.S. Provisional Patent Application Ser. No. 62/815,688; Filed: Mar. 8, 2019; the full disclosure of which is incorporated herein by reference.

BACKGROUND OF THE INVENTION

1. Field of the Invention

The present invention relates generally to pistons and cylinders, especially those operating as control valves and the like. The present invention relates more specifically to an O-ring piston seal arrangement that reduces breakaway friction (also known as "stiction") between the piston and the cylinder wall.

2. Description of the Related Art

Prior art dynamic O-ring piston design requires O-ring "squeeze" or compression of typically 10%-30% or more, so as to insure effective dynamic fluid sealing under various conditions, materials, and fluid media. Although the conventional prior art O-ring design is simple and economical, this requirement that the O-ring be "squeezed" against the cylinder wall is the source of many problems.

In particular is the problem of breakaway friction, commonly referred to as "stiction". For those devices that require accurate control with smooth and precise piston movement from a stopped (no movement) position, such as pneumatically operated pressure regulators, metering flow control valves, and position actuators, stiction can be a major problem. Stiction occurs when the piston O-ring seal adheres to the gland and cylinder walls when left motionless for an extended period of time. The higher the amount of O-ring squeeze, the greater the amount of stiction that exists to overcome. In addition, the longer the stopped action, the greater the stiction, or resistance to move and breakaway from a stuck position. An increased pneumatic (or fluid) pressure force is thereby needed to overcome this stiction, so as to then start the movement of this piston. But once this stiction is overcome and the movement begins, then this increased force (that was needed to overcome the stiction) now causes an "overshoot" condition, moving the piston beyond its desired position, which results in erratic and poor sensitivity control of the fluid-controlled device.

There exist commercially available seals which exhibit low stiction properties, such as "U-cup" or "V-cup" type seals, which are much more expensive and physically larger than a comparable O-ring seal. The physical size can be especially prohibitive in compact gas control systems. Also, since these seals are limited in both available sizes and material, they are limited in applications and not suitable for many special applications. Some of the non-suitable special applications may include corrosive, hazardous fluid media and/or high-low temperature applications, all requiring compatible seal materials which are readily available in O-ring seals.

Other problems associated with O-ring squeeze include: compression set with the eventual leakage of fluid across the damaged O-ring seal over time; tearing portions of the O-ring seal that adhere to the piston groove and cylinder wall when movement has been stopped for a prolonged, or an overly extended period of time; excessive operating friction and heat from too much squeeze, resulting in premature seal failure; and fluid leakage from too little squeeze, especially with higher fluid pressures.

SUMMARY OF THE INVENTION

An example embodiment of the present invention is directed to an O-ring piston which includes one or more O-rings installed within a uniquely designed groove on a piston which together operate within a cylinder housing. There has thus been outlined, rather broadly, some of the features of a "stictionless" O-ring piston seal in order that the detailed description thereof may be better understood, and in order that the present contribution to the art may be better appreciated. There are additional features of the stictionless O-ring piston seal that will be described hereinafter and that will form the subject matter of the claims appended hereto. In this respect, before explaining at least one embodiment of the stictionless O-ring piston seal in detail, it is to be understood that the stictionless O-ring piston seal is not limited in its application to the details of construction or to the arrangements of the components set forth in the following description or illustrated in the drawings. The stictionless O-ring piston seal is capable of other embodiments and of being practiced and carried out in various ways. Also, it is to be understood that the phraseology and terminology employed herein are for the purpose of the description and should not be regarded as limiting.

One object of the present invention is to provide a stictionless O-ring piston seal for providing a piston O-ring seal design that yields little or no breakaway friction (also known as "stiction"). Another object of the present invention is to provide a stictionless O-ring piston seal that is simple and economical to produce. Another object is to provide a stictionless O-ring piston seal that has "pressure enhanced" sealing; whereby the sealing force increases with fluid pressure, so as to prevent leakage even under higher fluid pressure conditions. Another object is to provide a stictionless O-ring piston seal that has a higher operational life than typical O-ring piston seals. Another object is to provide a stictionless O-ring piston seal that is suitable for both single acting and double acting piston applications. Another object is to provide a stictionless O-ring piston seal that is suitable for all fluid types, as well as for high temp and corrosive fluid applications.

Other objects and advantages of the various embodiments of the present invention will become obvious to one skilled in the art and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1A:
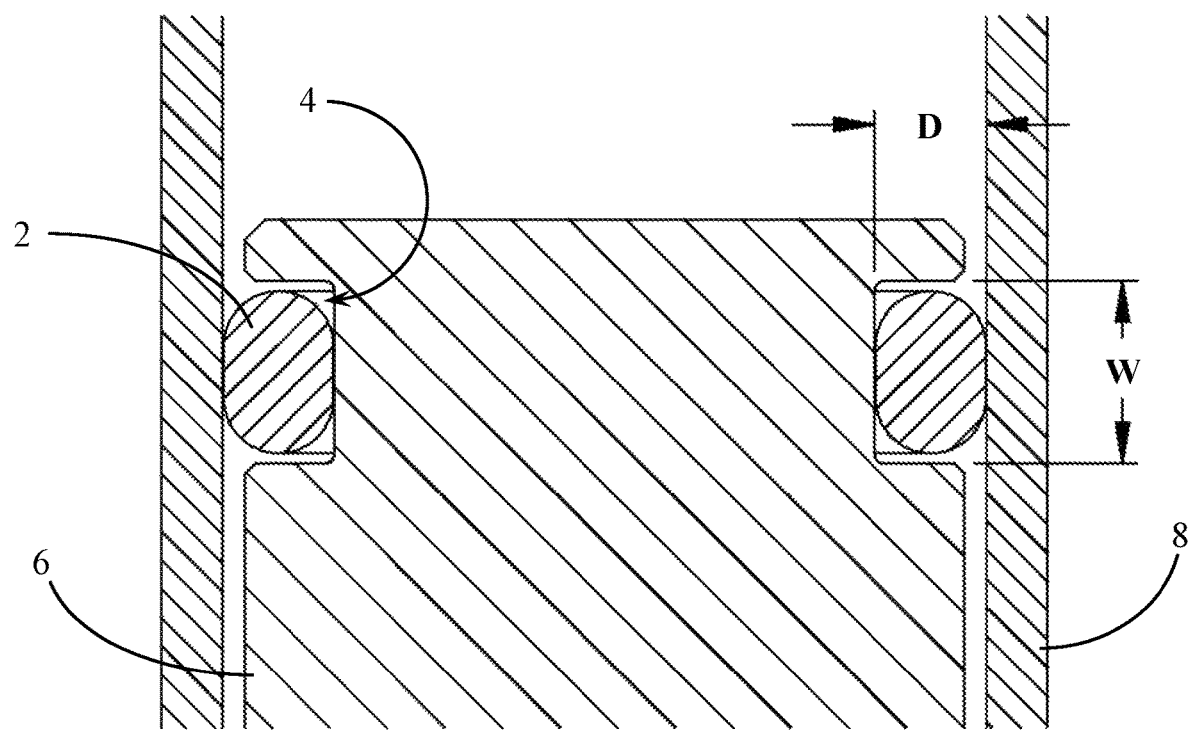
FIG. 1A is a cross-sectional view of a typical piston with O-ring seal of the prior art showing constant pressed contact between the piston, the O-ring, and the cylinder wall.

Turning now descriptively to the drawings, in which similar reference characters denote similar elements throughout the several views, the figures illustrate an example embodiment that includes an O-Ring installed in a uniquely designed groove formed on a piston, and which jointly operate within a cylinder housing.

Reference is made first to FIG. 1A which is a cross-sectional view of a typical piston with O-ring seal of the prior art showing constant pressed contact between the piston, the O-ring, and the cylinder wall. In this view, O-ring 2 is seen positioned in piston groove 4 compressed between piston 6 and cylinder housing 8. The dimensions that are relevant to the problems in the prior art include the width W of piston groove 4 and the distance D representing the depth of the piston groove 4 plus the clearance between the piston 6 and the cylinder wall 8.

Figure 1B:
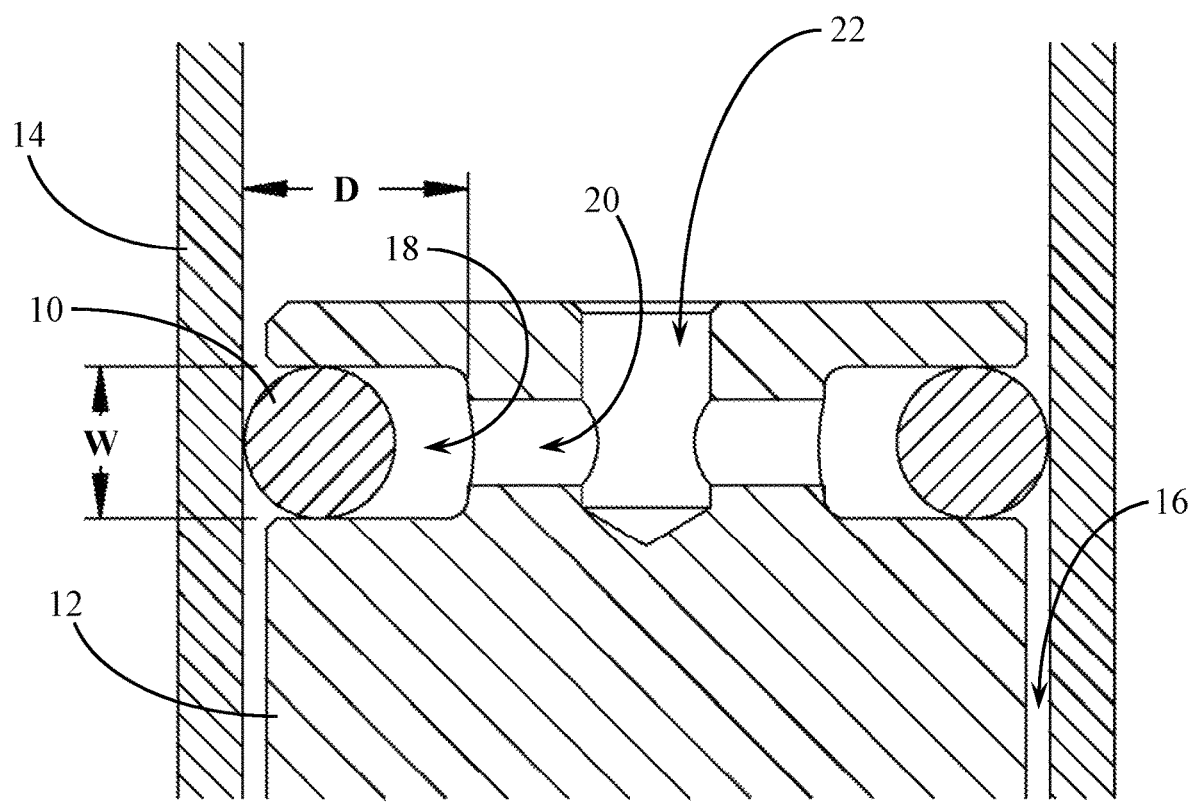
FIG. 1B is a cross-sectional view of a piston with O-ring seal of the present invention showing a first preferred embodiment of the internal passageways of the piston.

Reference is next made to FIG. 1B which is a cross-sectional view of a piston with O-ring seal of the present invention showing a first preferred embodiment of the internal passageways of the piston. In this view, O-ring 10 is seen positioned on piston 12 within piston groove 18. Piston 12 is movably positioned within cylinder housing 14 with a piston clearance 16 between the two components. The width W of the piston groove 18 in the present invention (FIG. 1B) is approximately equal to the O-ring width (cross-sectional diameter) and generally less than the width W typical in the prior art (FIG. 1A). In the prior art, the greater groove width is necessary to accommodate the inherent squeeze that occurs when the O-ring is pressed between base of the groove and the cylinder wall (again, see FIG. 1A) to form an adequate seal. In contrast, the distance D in the present invention is greater than that typical of the prior art as this greater depth is intended to establish a space "behind" O-ring 10 within the groove 18. Providing a fluid path between the space above the piston within the cylinder and the above described space behind the O-ring is an array of passageways made up of axial passageway 22 and a number of radial passageways 20.

The O-rings in the present invention can be made of virtually any elastomeric material. In its natural relaxed and "non-pressurized" state, the O-ring outside diameter is approximately equal to the diameter of the cylinder inner wall, and the O-ring cross sectional diameter is approximately equal to the piston groove width (W). The O-rings in the present invention are, as commercially available, preferably circular donut-shaped rings, commonly of a circular cross section, made of virtually any elastomeric material, and used for fluid sealing purposes. The O-rings can be any overall size and cross sectional size, so long as it can diametrically expand and subsequently contract back to its normal relaxed position. The O-rings of the present invention could also have square or other cross-sectional shapes. For purposes of this disclosure, any reference to an "O-ring" includes any flexible resilient structure typically placed on a piston to seal against the walls of the associated cylinder. An additional lower O-ring can be used in double acting piston designs as described in more detail below.

As described above, the piston of the present invention contains an O-ring groove with a width (W) sized approximately equal to the O-ring cross sectional diameter. The piston groove depth (D) (actually the distance from the inside wall of the groove to the cylinder inner wall) is equal to or greater than the O-ring cross sectional diameter. The piston of the present invention is typically cylindrical shaped to fit within the cylinder housing, and contains the described groove to hold the O-ring. The piston can be made of virtually any material. As mentioned above, the piston can also include a lower groove with a second O-ring for double-acting piston design.

Figure 2A:
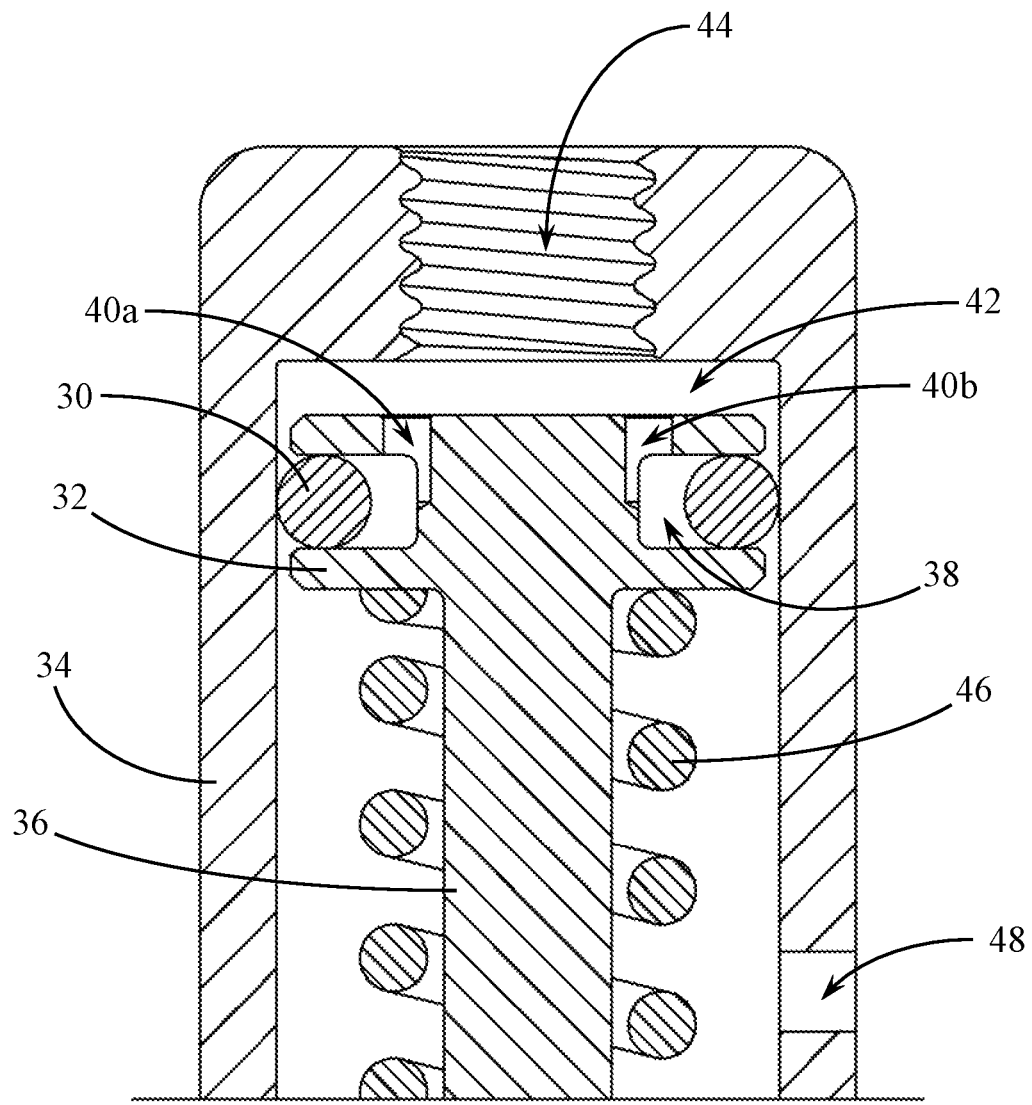
FIG. 2A is a cross-sectional view of a single acting piston with O-ring seal of the present invention showing a second preferred embodiment of the internal passageways of the piston and with the piston in a non-actuated condition.
Figure 2B:
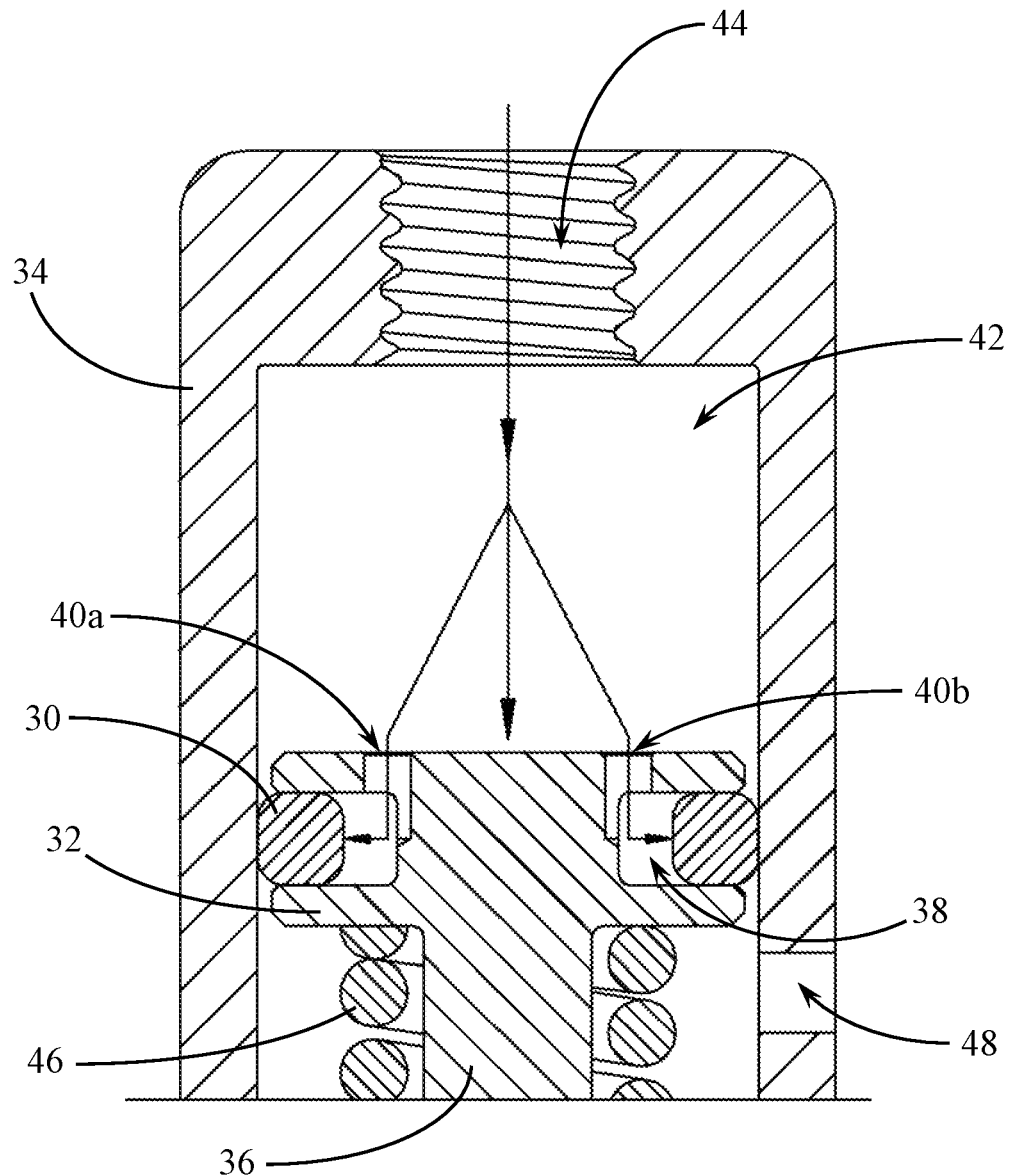
FIG. 2B is a cross-sectional view of a single acting piston with O-ring seal of the present invention showing the second preferred embodiment of the internal passageways of the piston with the piston in an actuated condition.

Reference is next made to FIGS. 2A & 2B which show the operation of a single acting piston using the basic structures of the present invention. FIG. 2A is a cross-sectional view of a single acting piston with O-ring seal of the present invention showing an alternate preferred embodiment of the internal passageways of the piston with the piston in a non-actuated condition. FIG. 2B is a cross-sectional view of the single acting piston with O-ring seal of the present invention shown in FIG. 2A but with the piston in an actuated condition.

In the views of FIGS. 2A & 2B, O-ring 30 is seen positioned on piston crown 32 within piston groove 38. Piston crown 32 is supported by (and typically integral with) piston shaft 36 to form the piston in this embodiment. The piston is movably positioned within cylinder housing 34 again with a piston clearance between the two components. The space "behind" O-ring 30 within the groove 38 is, as described above, in fluid communication with the upper fluid chamber 42 by way of vertical passageways 40a & 40b. In a manner distinct from the first embodiment described above, the fluid path between the space above the piston within the cylinder, and the space behind the O-ring in the alternate embodiment shown, is an array of passageways 40a-40n (40a & 40b shown in FIGS. 2A & 2B) that extend in a generally orthogonal direction through the upper face of the piston. These orthogonal passageways (40a & 40b in FIGS. 2A & 2B) extend into and join with the inside wall portion of groove 38.

The cylinder housing of the present invention generally serves to enclose the piston with the fitted O-ring to form one or two variable volume chambers, one above the piston and one below. A fluid connection 44 is configured at one end of cylinder housing 34 to allow movement of fluid into and out from the variable volume chamber established above the piston. In some configurations, an additional lower fluid connection 48 is positioned at the opposing end of the cylinder housing 34 to allow venting or to allow movement of fluid into and out from the variable volume chamber established below the piston. In the single acting piston embodiment shown in FIGS. 2A & 2B, a piston spring 46 is provided on piston shaft 36 below piston crown 32 to preference the piston into the cylinder and to resist the force exerted by pressurized fluid that may be directed into the upper fluid chamber 42.

Once again, because the O-ring outside diameter (in a "non-pressurized" condition) approximately equals the cylinder wall inside diameter, the outside diameter surface of the O-ring is in "loose" contact with the inside surface of the cylinder wall. While this initial loose contact may not provide an optimal seal, it does significantly reduce the breakaway friction (striction) that must be overcome to initiate piston movement. As fluid flows into the variable volume chamber 42 shown in FIGS. 2A & 2B the "pressurized" fluid flows through the passageways in the piston to fill the space within the piston groove behind the O-ring. Because the groove width approximately equals the O-ring cross-sectional diameter, this pressurized fluid has nowhere to go but to press outward on the O-ring to press it tighter against the cylinder wall, thereby providing an optimal seal only after motion of the piston has begun. The fluid communication in this actuated condition, is (as shown by the flow arrows in the figure) in the direction from upper fluid connection 44 to upper fluid chamber 42 to passageways 40a & 40b into piston groove 38 acting on O-ring 30 inside diameter surface. O-ring 30 in this view is therefore shown slightly deformed from its resting circular cross-section, coming into greater contact with the cylinder wall and providing a tight seal to the pressurized fluid now within the upper chamber.

Figure 3A:
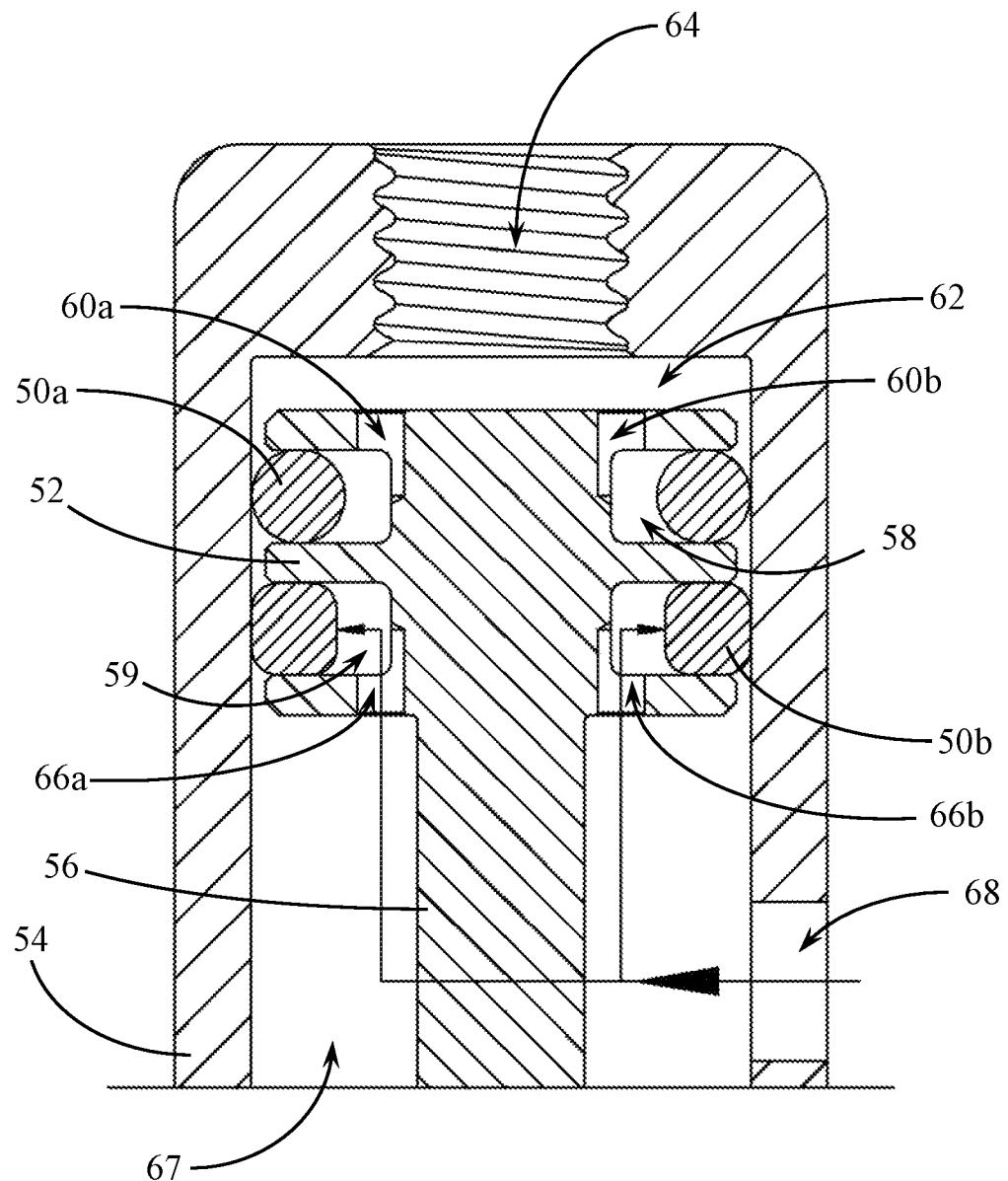
FIG. 3A is a cross-sectional view of a double acting piston with O-ring seal of the present invention showing the second preferred embodiment of the internal passageways of the piston and with the piston in a reverse actuated condition.
Figure 3B:
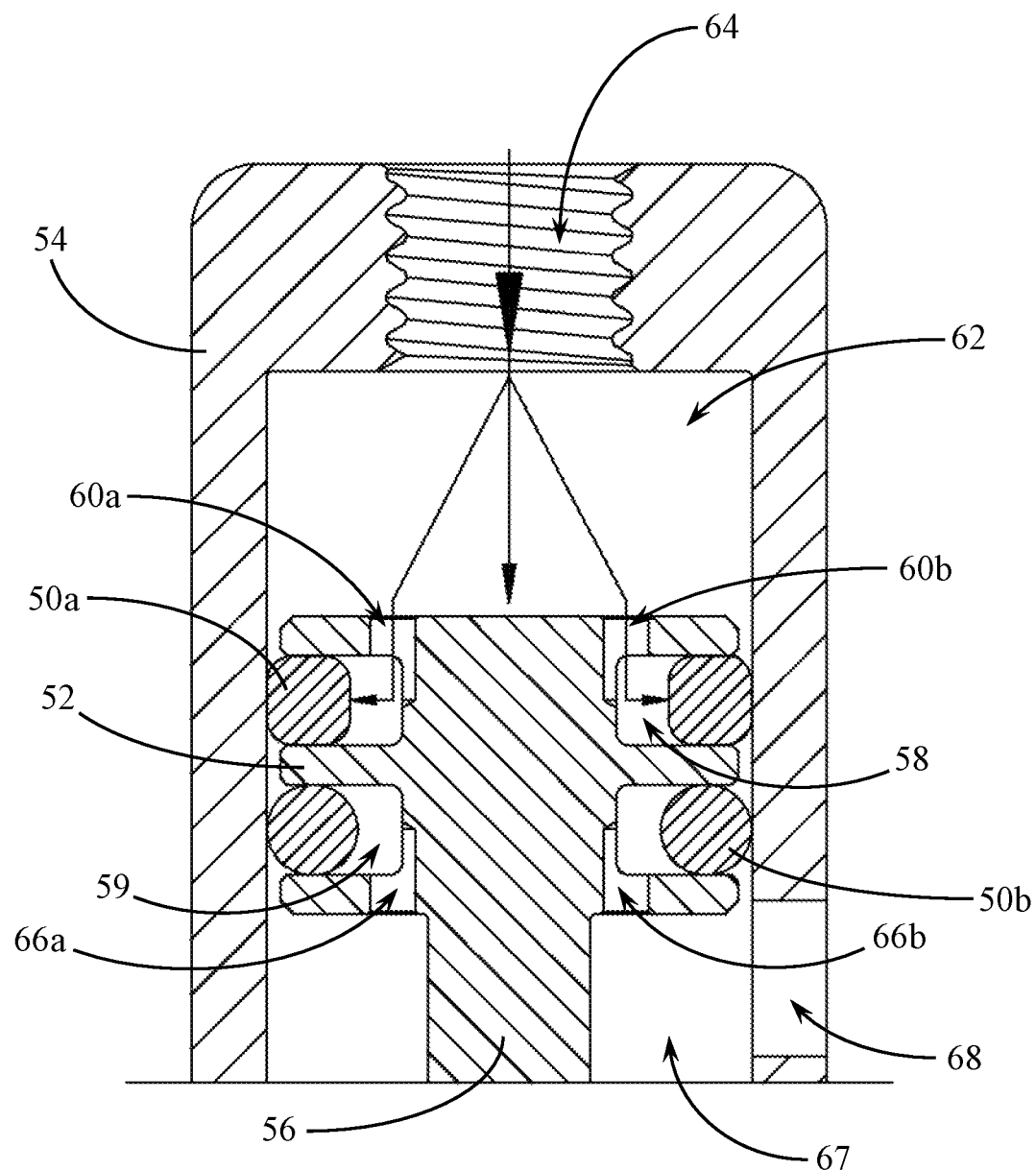
FIG. 3B is a cross-sectional view of the double acting piston with O-ring seal of the present invention showing the second preferred embodiment of the internal passageways of the piston and with the piston in a forward actuated condition.

Reference is next made to FIGS. 3A & 3B which provide views of a double acting piston using the structures of the present invention. FIG. 3A is a cross-sectional view of a double acting piston with O-ring seal of the present invention, again showing the second preferred embodiment of the internal passageways of the piston. In the view of FIG. 3A, the piston, made up of piston crown 52 and piston shaft 56, is in a reverse actuated condition within cylinder housing 54. As shown in FIGS. 3A & 3B, a double-acting piston design includes, in addition to upper O-ring 50a, positioned in upper groove 58, a lower O-ring 50b positioned in lower groove 59. The fluid communication in this reverse actuated condition, is (as shown by the flow arrows in the figure) in the direction from lower fluid connection 68 to lower fluid chamber 67 to lower passageways 66a & 66b into lower piston groove 59 acting on O-ring 50b inside diameter surface. O-ring 50b in this view is therefore shown slightly deformed from its resting circular cross-section, coming into greater contact with the cylinder wall and providing a tight seal to the pressurized fluid now within the lower chamber.

FIG. 3B is a cross-sectional view of the double acting piston with O-ring seal of the present invention again showing the second preferred embodiment of the internal passageways of the piston and with the piston in a forward actuated condition. In this view, the function is much the same as that reflected in the single acting piston described in connection with FIG. 2B.

Figure 4:
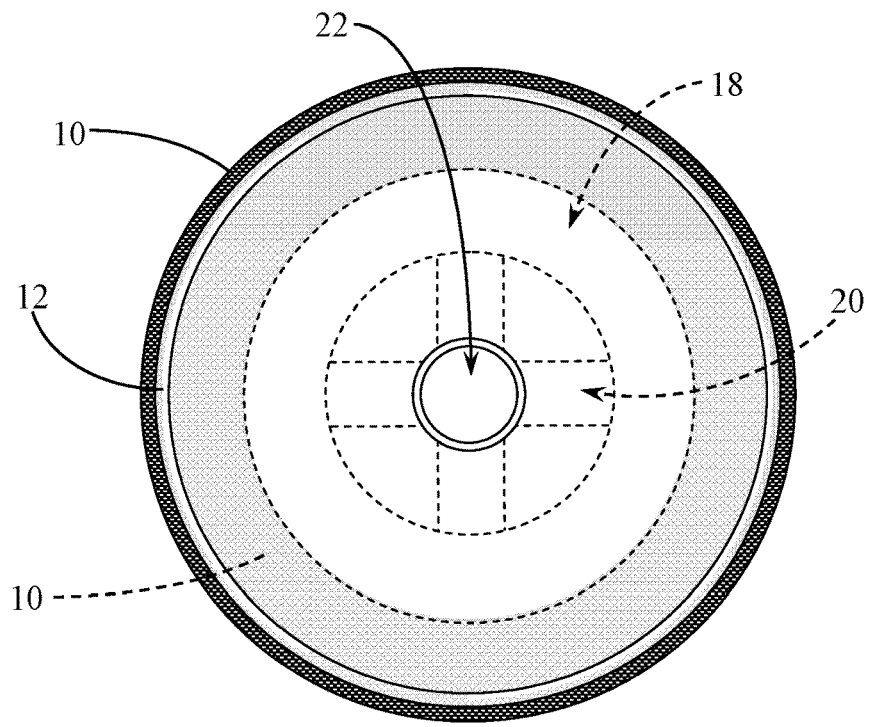
FIG. 4 is a top plan view of the present invention shown in FIG. 1B with the first preferred embodiment of the internal passageways of the piston.
Figure 5:
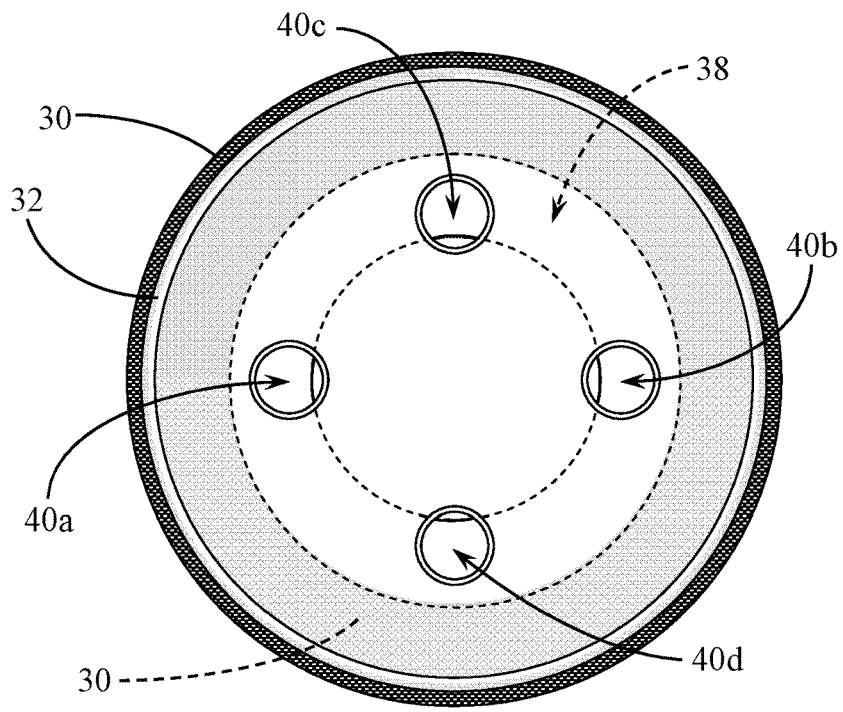
FIG. 5 is a top plan view of the present invention shown in FIGS. 2A & 2B with the second preferred embodiment of the internal passageways of the piston.

Reference is next made to FIGS. 4 & 5 for top views of the pistons shown generally in FIGS. 1B & 2A respectively. These views clarify the alternate embodiments for the passageways into the top faces of the pistons that allow the flow of fluid into the groove space behind the fitted O-rings. FIG. 4 is a top plan view of the present invention shown in FIG. 1B with the first preferred embodiment of the internal passageways of the piston. In this view, O-ring 10 is seen to extend just beyond the diameter of piston 12. Piston groove 18 is deep enough to accommodate O-ring 10 and to additionally provide a space "behind" O-ring 10 as required for the functionality of the present invention. Radial passageways 20 extend from this space in groove 18 through to a central axial passageway 22 which opens out from the top face of piston 12. This allows a relatively even flow of pressurized fluid into the groove behind the O-ring so as to press outward in all directions on the O-ring.

FIG. 5 is a top plan view of the present invention shown in FIGS. 2A & 2B with the second preferred embodiment of the internal passageways of the piston. In this view, O-ring 30 is seen to extend just beyond the diameter of piston 32. Piston groove 38 is deep enough to accommodate O-ring 30 and to additionally provide a space "behind" O-ring 30 as required for the functionality of the present invention. In place of the radially oriented passageways of the embodiment shown in FIG. 4, a radial array of four vertical passageways 40a-40d extend from the top face of the piston 12 into the space in groove 38. This arrangement also allows a relatively even flow of pressurized fluid into the groove behind the O-ring so as to press outward in all directions on the O-ring.

Figure 6A:
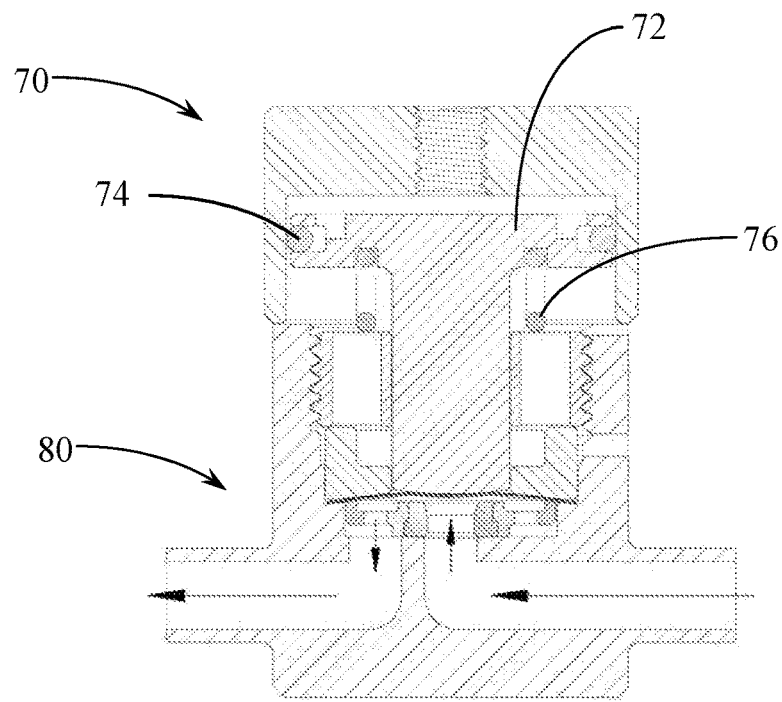
FIG. 6A is a cross-sectional view of one implementation of the single acting piston with O-ring seal of the present invention showing the piston in a non-actuated (open) condition.
Figure 6B:
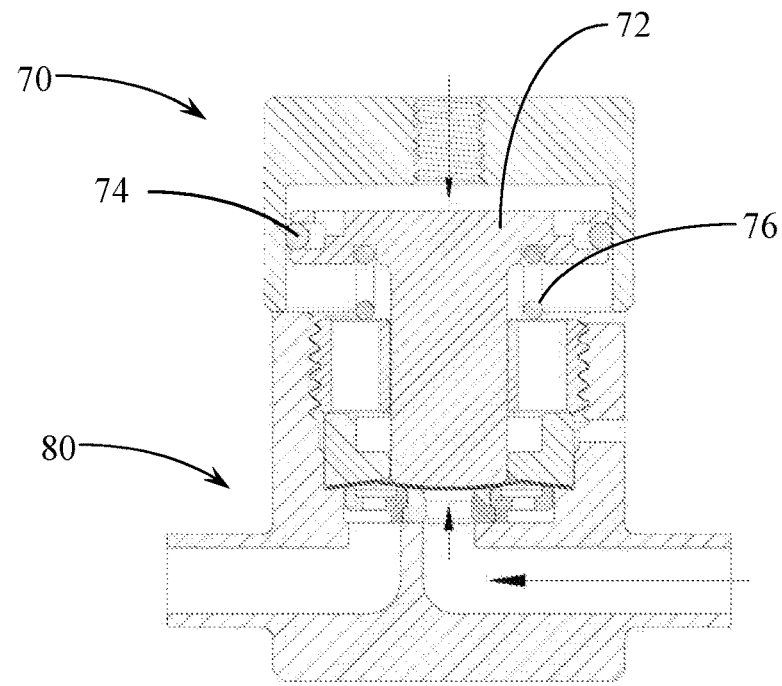
FIG. 6B is a cross-sectional view of the implementation of the single acting piston with O-ring seal of the present invention shown in FIG. 6A showing the piston in an actuated (closed) condition.

Reference is finally made to FIGS. 6A & 6B for a description of the integration of the structures of the present invention into a single acting piston operating as a control valve for a flow line. FIG. 6A is a cross-sectional view of one implementation of the single acting piston with O-ring seal of the present invention showing the piston in a non-actuated (open flow line) condition. Piston 72 is fitted with O-ring 74 and is positioned within valve head assembly 70 (which serves as the cylinder housing in this application of the invention). Piston spring 76 preferences the piston 72 up into the cylinder creating a "normally open" valve that allows a fluid flow as shown by the arrows in FIG. 6A.

FIG. 6B is a cross-sectional view of the implementation of the single acting piston with O-ring seal of the present invention shown in FIG. 6A but with the piston in an actuated (valve closed) condition. In this condition, control fluid flow into the chamber above the piston directs the piston downward to cut off the valve (flow arrows) and concurrently direct control fluid through the passageways in the piston 72 to force the O-ring 74 against the cylinder wall as described above.

As shown in the prior art view of FIG. 1A, conventional dynamic O-ring groove design requires O-ring "squeeze (compression)" of typically 10%-30% or more. Once again, this squeeze is the source of many problems. As shown in FIG. 2A, in the present invention (non-actuated state) the O-ring exerts little to no side force, or squeeze onto the cylinder inner wall, as the outside diameter of the O-ring is approximately equal to the diameter of the inner wall. As a result, there is no undue stress or squeeze upon the O-ring in the non-actuated (non-pressurized) condition. When fluid pressure enters the upper connection into the upper fluid chamber as shown in FIG. 2B (actuated view) this pressure force acting on the top of the piston causes the start of piston downward movement against upward force of the spring (typically used in single acting piston designs). Simultaneously, fluid pressure enters the passageways into the piston groove exerting force on the O-ring causing it to expand outward and produce a proportional amount of sealing force against the cylinder inner wall and groove side wall surfaces. The higher the fluid pressure, the greater the proportional sealing force, thereby creating a "pressure enhanced" sealing. This feature provides variable force, as needed, to make a positive seal dependent on and proportional to the fluid pressure conditions, which eliminates over-compressing the seal in low pressure applications, and under-compressing the seal in high pressure application. In double-acting pistons as shown in FIGS. 3A & 3B, the operation is the same dependent on the direction of fluid pressure. The lower O-ring and piston respond accordingly to the fluid pressure applied from the lower fluid connection into the lower fluid chamber and into the passageways into the lower piston groove.

Unless otherwise defined, all technical and scientific terms used herein have the same meaning as commonly understood by one of ordinary skill in the art to which this invention belongs. Although methods and materials similar to or equivalent to those described herein can be used in the practice or testing of the stictionless O-ring piston seal, suitable methods and materials are described above. All publications, patent applications, patents, and other references mentioned herein are incorporated by reference in their entirety to the extent allowed by applicable law and regulations. The stictionless O-ring piston seal may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

I claim:

1. A piston and cylinder assembly structured to reduce breakaway friction between the piston and cylinder upon initial movement of the piston within the cylinder, the assembly comprising:
    (a) a cylinder having a cylinder wall and a cylinder head, the cylinder wall having an inside diameter, the cylinder further comprising at least one fluid flow port through at least the cylinder head or the cylinder wall;
    (b) a piston movably arranged within the cylinder, the piston and the cylinder together defining at least one variable volume internal chamber, the piston comprising:
        (i) a piston crown comprising a top face and a peripheral groove, the peripheral groove comprising an inner wall portion, and upper and lower side wall portions extending to a perimeter opening, the peripheral groove having a width, a depth, and an inner wall portion diameter, the piston crown further comprising at least one passageway between the top face of the piston crown and the inner wall portion of the peripheral groove; and
        (ii) a piston shaft connected to and supporting the piston crown, the piston shaft extending from the piston crown; and
    (c) an O-ring positioned on the piston in the piston peripheral groove, the O-ring having a thickness approximately equal to the width of the peripheral groove, the O-ring having an outer diameter approximately equal to the inside diameter of the cylinder wall and an inner diameter greater than the diameter of the inner wall portion of the peripheral groove;
    wherein the piston, with the O-ring in a relaxed condition, experiences little or no friction between the piston and the cylinder wall; and
    wherein an increase in a volume of fluid material within the at least one variable volume internal chamber between the piston and the cylinder initially moves the piston outward within the cylinder, and directs a portion of the increasing volume of fluid material through the at least one passageway between the top face of the piston crown and the inner wall portion of the peripheral groove, thereby pressing the O-ring into more forceful contact with the cylinder wall to form a tighter seal between the piston and the cylinder.

2. The piston and cylinder assembly of claim 1 wherein the at least one passageway between the top face of the piston crown and the inner wall portion of the peripheral groove comprises:
    an axial port positioned on and extending generally through the top face of the piston crown; and
    at least one radial port extending from the axial port to the inner wall portion of the peripheral groove.

3. The piston and cylinder assembly of claim 2 wherein the at least one radial port comprises four radial ports oriented in 90° radial spacing extending out from the axial port.

4. The piston and cylinder assembly of claim 1 wherein the at least one passageway between the top face of the piston crown and the inner wall portion of the peripheral groove comprises:
    a plurality of orthogonal ports positioned in a radial array on, and extending generally through, the top face of the piston crown, the plurality of orthogonal ports each extending at least partially into the inner wall portion of the peripheral groove.

5. The piston and cylinder assembly of claim 4 wherein the plurality of orthogonal ports comprises four orthogonal ports oriented in 90° radial array spacing on the top face of the piston crown.

6. The piston and cylinder assembly of claim 1 further comprising a piston spring, the piston spring configured to normally urge the piston into the cylinder to reduce a volume within the at least one variable volume internal chamber, and to resist the outward force on the piston resulting from an increase in a volume of fluid material within the at least one variable volume internal chamber between the piston and the cylinder.

7. The piston and cylinder assembly of claim 1 wherein the at least one variable volume internal chamber comprises a first internal chamber formed above the piston crown and a second internal chamber formed below the piston crown; and
    wherein the at least one port through at least the cylinder head or the cylinder wall comprises a first port into the first internal chamber and a second port into the second internal chamber.

8. A piston and cylinder assembly structured to reduce breakaway friction between the piston and cylinder upon initial movement of the piston within the cylinder, the assembly comprising:
    (a) a cylinder having a cylinder wall and a cylinder head, the cylinder wall having an inside diameter, the cylinder further comprising at least two fluid flow ports through at least the cylinder head and/or the cylinder wall;

(b) a piston movably arranged within the cylinder, the piston and the cylinder together defining two variable volume internal chambers, the piston comprising:
  (i) a piston crown comprising a top face, a bottom face, and at least two parallel peripheral grooves, each of the peripheral grooves comprising an inner wall portion, and upper and lower side wall portions extending to a perimeter opening, each of the peripheral grooves having a width, a depth, and an inner wall portion diameter, the piston crown further comprising at least one passageway between the top face of the piston crown and the inner wall portion of a first of the at least two peripheral grooves, the piston crown further comprising at least one passageway between the bottom face of the piston crown and the inner wall portion of a second of the at least two peripheral grooves; and
  (ii) a piston shaft connected to and supporting the piston crown;
(c) a first O-ring positioned on the piston in the first of the at least two peripheral grooves, the first O-ring having a thickness approximately equal to the width of the first peripheral groove, the first O-ring having an outer diameter approximately equal to the inside diameter of the cylinder wall and an inner diameter greater than the diameter of the inner wall portion of the first peripheral groove; and
(d) a second O-ring positioned on the piston in the second of the at least two peripheral grooves, the second O-ring having a thickness approximately equal to the width of the second peripheral groove, the first O-ring having an outer diameter approximately equal to the inside diameter of the cylinder wall and an inner diameter greater than the diameter of the inner wall portion of the second peripheral groove;
wherein the piston, with the first and second O-rings in a relaxed condition, experiences little or no friction between the piston and the cylinder wall;
wherein an increase in a volume of fluid material within a first of the two variable volume internal chambers between the piston and the cylinder initially moves the piston in a first direction within the cylinder, and directs a portion of the increasing volume of fluid material through the at least one passageway between the top face of the piston crown and the inner wall portion of the first peripheral groove, thereby pressing the first O-ring into more forceful contact with the cylinder wall; and
wherein an increase in a volume of fluid material within a second of the two variable volume internal chambers between the piston and the cylinder initially moves the piston in a second direction within the cylinder, and directs a portion of the increasing volume of fluid material through the at least one passageway between the bottom face of the piston crown and the inner wall portion of the second peripheral groove, thereby pressing the second O-ring into more forceful contact with the cylinder wall.

9. The piston and cylinder assembly of claim 8 wherein the at least one passageway between the top face of the piston crown and the inner wall portion of the first peripheral groove comprises:
  an axial port positioned on and extending generally through the top face of the piston crown; and
  at least one radial port extending from the axial port to the inner wall portion of the first peripheral groove.

10. The piston and cylinder assembly of claim 9 wherein the at least one radial port comprises four radial ports oriented in 90° radial spacing extending out from the axial port.

11. The piston and cylinder assembly of claim 8 wherein the at least one passageway between the top face of the piston crown and the inner wall portion of the first peripheral groove comprises:
  a plurality of orthogonal ports positioned in a radial array on, and extending generally through, the top face of the piston crown, the plurality of orthogonal ports each extending at least partially into the inner wall portion of the first peripheral groove.

12. The piston and cylinder assembly of claim 11 wherein the plurality of orthogonal ports comprises four orthogonal ports oriented in 90° radial array spacing on the top face of the piston crown.

13. The piston and cylinder assembly of claim 8 wherein the at least one passageway between the bottom face of the piston crown and the inner wall portion of the second peripheral groove comprises:
  a plurality of orthogonal ports positioned in a radial array on, and extending generally through, the bottom face of the piston crown, the plurality of orthogonal ports each extending at least partially into the inner wall portion of the second peripheral groove.

14. The piston and cylinder assembly of claim 13 wherein the plurality of orthogonal ports comprises four orthogonal ports oriented in 90° radial array spacing on the bottom face of the piston crown.

15. The piston and cylinder assembly of claim 8 further comprising a piston spring, the piston spring configured to normally urge the piston into the cylinder to reduce a volume within a first of the at least two variable volume internal chambers between the piston and the cylinder, and to resist the outward force on the piston resulting from an increase in a volume of fluid material within a first of the at least two variable volume internal chambers between the piston and the cylinder.

16. A piston for use within a cylinder, the cylinder having a cylinder wall, the piston structured to reduce breakaway friction between the piston and cylinder upon initial movement of the piston within the cylinder, the piston comprising:
  a piston crown comprising at least one face and at least one peripheral groove, the at least one peripheral groove comprising an inner wall portion, and upper and lower side wall portions extending to a perimeter opening, the peripheral groove having a width, a depth, and an inner wall portion diameter, the piston crown further comprising at least one passageway between the at least one face of the piston crown and the inner wall portion of the at least one peripheral groove; and
  at least one O-ring positioned on the piston in the at least one peripheral groove, the at least one O-ring having a thickness approximately equal to the width of the at least one peripheral groove, the at least one O-ring having an outer diameter approximately equal to an inside diameter of the cylinder wall and an inner diameter greater than the diameter of the inner wall portion of the at least one peripheral groove.

17. The piston of claim 16 wherein the at least one face of the piston crown comprises a top face and the at least one passageway between the top face of the piston crown and the inner wall portion of the at least one peripheral groove comprises:
  an axial port positioned on and extending generally through the top face of the piston crown; and at least one radial port extending from the axial port to the inner wall portion of the at least one peripheral groove.

18. The piston of claim 16 wherein the at least one face of the piston crown comprises a top face and the at least one passageway between the top face of the piston crown and the inner wall portion of the at least one peripheral groove comprises:
   a plurality of orthogonal ports positioned in a radial array on, and extending generally through, the top face of the piston crown, the plurality of orthogonal ports each extending at least partially into the inner wall portion of the at least one peripheral groove.

19. The piston of claim 16 wherein the at least one face of the piston crown comprises a top face and a bottom face, and the at least one peripheral groove comprises at least an upper peripheral groove and a lower peripheral groove,
   wherein the at least one passageway between the top face of the piston crown and the inner wall portion of the upper peripheral groove comprises an axial port positioned on and extending generally through the top face of the piston crown, and at least one radial port extending from the axial port to the inner wall portion of the upper peripheral groove; and
   wherein the at least one passageway between the bottom face of the piston crown and the inner wall portion of the lower peripheral groove comprises a plurality of orthogonal ports positioned in a radial array on, and extending generally through, the bottom face of the piston crown, the plurality of orthogonal ports each extending at least partially into the inner wall portion of the lower peripheral groove.

20. The piston of claim 16 wherein the at least one face of the piston crown comprises a top face and a bottom face, and the at least one peripheral groove comprises at least an upper peripheral groove and a lower peripheral groove,
   wherein the at least one passageway between the top face of the piston crown and the inner wall portion of the upper peripheral groove comprises a plurality of orthogonal ports positioned in a radial array on, and extending generally through, the top face of the piston crown, the plurality of orthogonal ports each extending at least partially into the inner wall portion of the upper peripheral groove; and
   wherein the at least one passageway between the bottom face of the piston crown and the inner wall portion of the lower peripheral groove comprises a plurality of orthogonal ports positioned in a radial array on, and extending generally through, the bottom face of the piston crown, the plurality of orthogonal ports each extending at least partially into the inner wall portion of the lower peripheral groove.

* * * * *